Oct. 31, 1939.  R. A. ERREN  2,177,801
ELECTRIC GENERATOR
Filed Feb. 1, 1938
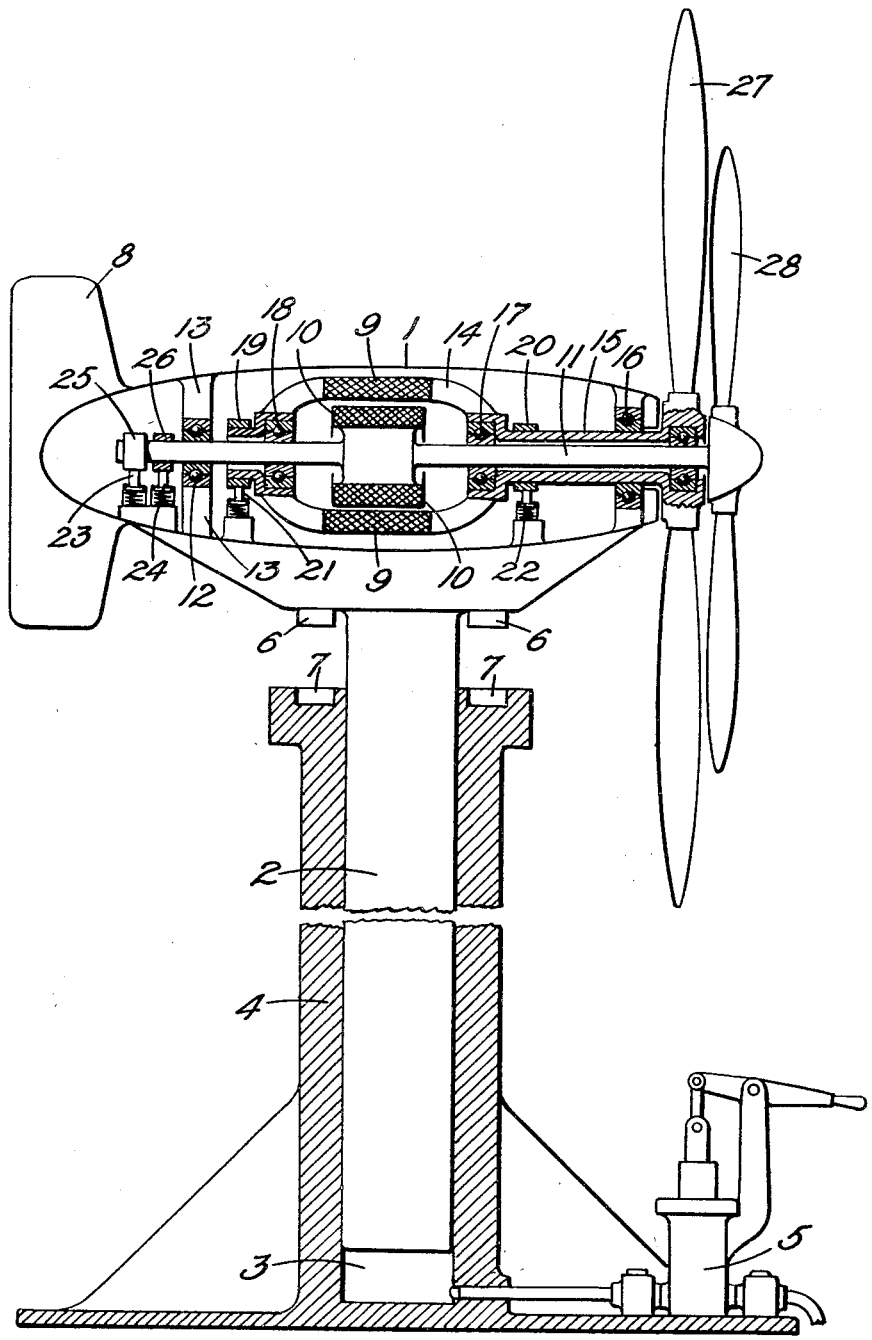
Inventor,
Rudolf A. Erren
By
Att'y Patented Oct. 31, 1939

2,177,801

UNITED STATES PATENT OFFICE 2,177,801

ELECTRIC GENERATOR

Rudolf Arnold Erren, London, England

Application February 1, 1938, Serial No. 188,151
In Great Britain February 4, 1937

3 Claims. (Cl. 290—55)

This invention relates to electric generators, and has for its primary object the provision of an efficient generator adapted to be driven by wind or other fluid stream, or by movement relative to a fluid, as for example in the case of a generator carried by a ship, aircraft, or other vehicle. A further object is to provide a construction of generator and of associated driving means whereby the relative rotation of the armature may be increased without the use of gearing for this purpose. It will be appreciated that in the case of a wind-driven propeller the R. P. M. are limited by the strength or speed of the wind. The R. P. M. of an armature driven by a propeller may, if desired, be increased by the use of gearing; this expedient is, however, liable to be costly, whilst unnecessarily increasing the weight of the generator and at the same time involving frictional losses. The invention seeks to provide a generator in which the limitation referred to above is obviated, by enabling the relative R. P. M. of the armature and field magnets to be increased to permit the production of a fairly smooth output.

A further object of the invention is the provision of a wind-driven generator which is simple and light in construction compared with its output and is protected from adverse weather.

The invention is illustrated in the accompanying drawing in which the only figure shows a preferred embodiment of a wind-driven generator mounted on a telescopic mounting for adjustment in respect of height. The generator comprises a casing 1 which is secured to a column 2 extending within a cylindrical bore 3 in the base 4 which is attached to the ground. Hydraulic pressure from a pump 5 is forced into the cylinder to extend the column 2 and thus to raise the casing 1 to the elevation where the wind is most favourable. The casing carries lugs 6 which are arranged to engage in recesses 7 at the upper end of the cylindrical part of the base 4, when the generator is in its lowest position, so as to prevent rotation of the casing about the axis of the cylinder. This rotation is normally possible for the purpose of orientating the generator in the proper direction relative to the wind and will be hereafter described. When locked against rotation the generator can be more easily inspected and repairs carried out.

The casing 1 which is of streamlined section, preferably having a ratio of length to greater diameter of about 5:1, carries at one extremity a fin 8 for ensuring that the longitudinal axis of the casing is orientated in the direction of the wind. It will be appreciated that the column 2 being engaged in the cylinder 3 allows such rotation. The armature winding and the field magnets of the generator are indicated at 9 and 10 respectively, and the field magnet 10 is supported on a shaft 11, which is borne at one end in a bearing 12 of the ball kind. The outer race is carried on lugs 13 formed on the inner wall of the casing 1. The armature 9 is carried on a casing 14, which at one end is secured to a hollow sleeve 15 co-axially mounted with the shaft 11 and surrounding it. The sleeve 15 is borne in the casing 1 by means of a ball bearing 16 and is further supported by means of bearings 17 and 18 at the respective ends of the casing 14. The casing 14 carries slip rings 19 and 20 for absorbing the armature current by way of brushes 21 and 22. These brushes are supported in the casing 1. The field current is supplied to the magnet system 10 by way of brushes 23 and 24 engaging slip rings 25 and 26 on the extremity of the shaft 11. It will be appreciated that if a direct current supply is required, commutators will be used in place of the slip rings.

The sleeve 15 carries a propeller 27 and the shaft 11 a propeller 28, these propellers rotating in opposite directions under the influence of the wind so as to relatively rotate the armature and field magnets.

It will be understood that in certain cases the field magnets and armature may be reversed in position, i. e., the magnets will be carried by the sleeve 15 and the armature on the shaft 11. Further, the invention may be used in relation to aircraft when preferably the streamlined body will not be angularly movable about its support.

It will be appreciated that the details of construction in the above description of one form of the invention are merely given by way of example and that variations are possible without departing from the scope of the invention as defined in the appended claims.

What I claim is:

1. A mounting for an electric generator of the type comprising a casing, a pair of co-axial shafts, a field magnet system carried by one of the shafts, an armature winding carried by the other of said shafts, a propeller on one of the shafts to rotate it in one sense and a propeller on the other shaft to rotate it in the opposite sense, said mounting including a column fixed with relation to and depending from the casing of the generator, a cylinder in which the column is vertically movable, and means for introducing fluid under pressure within the cylinder to elevate the column and thereby the electric generator to the extent desired.

2. A construction as defined in claim 1, wherein the column is, when elevated with respect to the cylinder, freely rotatable within the latter.

3. A construction as defined in claim 1, wherein the casing of the generator and the cylinder are formed with complementary interfitting means to fix the casing of the generator against rotation with respect to the cylinder in a predetermined relation between the generator and mounting.

RUDOLF ARNOLD ERREN.